Nov. 29, 1960  J. B. RICKS  2,961,871
SURFACE TESTING APPARATUS
Filed Aug. 20, 1954  4 Sheets-Sheet 1

INVENTOR
JAMES B. RICKS
BY Moore, Prangley & Clayton
ATTORNEYS

Nov. 29, 1960     J. B. RICKS     2,961,871
SURFACE TESTING APPARATUS

Filed Aug. 20, 1954     4 Sheets-Sheet 2

INVENTOR
JAMES B. RICKS
BY Moore, Prangley & Clayton
ATTORNEYS

Nov. 29, 1960  J. B. RICKS  2,961,871
SURFACE TESTING APPARATUS
Filed Aug. 20, 1954  4 Sheets-Sheet 3

INVENTOR
JAMES B. RICKS
BY Moore, Prangley & Clayton
ATTORNEYS

United States Patent Office 2,961,871
Patented Nov. 29, 1960

2,961,871

SURFACE TESTING APPARATUS

James B. Ricks, Highland Park, Ill., assignor, by mesne assignments, to Earl F. Simmons, Riverside, Ill.

Filed Aug. 20, 1954, Ser. No. 451,280

25 Claims. (Cl. 73—105)

This invention relates to a testing device and more particularly to a device for detecting, counting, measuring and cataloging voids in a surface.

In many instances it is desirable to determine the total number, the total size and the size distribution of voids or depressions in the surface of a material since the physical properties of the material are a function of the void content, void size and void size distribution in the material. For example in hardened concrete the relatively numerous very small voids or air cells contained therein are of interest since these voids have a great effect in protecting concrete from the damaging effects of freezing and thawing.

Accordingly it is an important object of the present invention to provide an improved apparatus for detecting, counting and measuring the length of voids or depressions in a surface; more particularly it is an object of the present invention to provide an improved electronic apparatus for detecting, counting and measuring the size of voids in surfaces.

Another object of the invention is to provide an electronic detecting and measuring device of the type set forth which makes delicate contact with the surface being examined whereby to give positive detection of voids and depressions, the contact being sufficiently delicate that weak edges of voids having the greater portion thereof below the surface are not broken away by the detecting apparatus.

Still another object of the invention is to provide a detecting member for an apparatus of the type set forth which has light intermittent contact with the surface being examined whereby the detecting portion may have a small radius and have good dimensional resolution.

Still another object of the invention is to provide an apparatus of the type set forth in which the accumulated data are recorded and in which the recorded data may be easily interpreted.

Still another object of the invention is to provide a void detecting member which positively differentiates the presence of a smooth plane surface and a void or depression.

Another object of the invention is to provide an accurate electronic means to record the voids intercepted and to measure the width of each void intercepted, the total length of voids intercepted being recorded.

A further object of the invention is to provide in an apparatus of the type set forth an accurate electronic means to sort and catalog void sizes according to the length of the chord of the void intercepted.

A still further object of the invention is to provide in an apparatus of the type described a mounting for samples which establishes a reference plane of the surface being examined with respect to the void detecting member, this mounting structure permitting specimens of different widths and thicknesses to be easily mounted and removed.

A further object of the invention is to provide a void counting, measuring and cataloging apparatus of the type described which is more accurate and faster than the apparatus utilized heretofore.

A further object of the invention is to provide in apparatus of the type described an improved gate pulse amplifier which has very rapid response and high sensitivity.

These and other objects and advantages of the invention will be better understood from the following description when taken in conjunction with the accompanying drawings wherein like reference numerals have been used to indicate like parts throughout.

Figure 1:
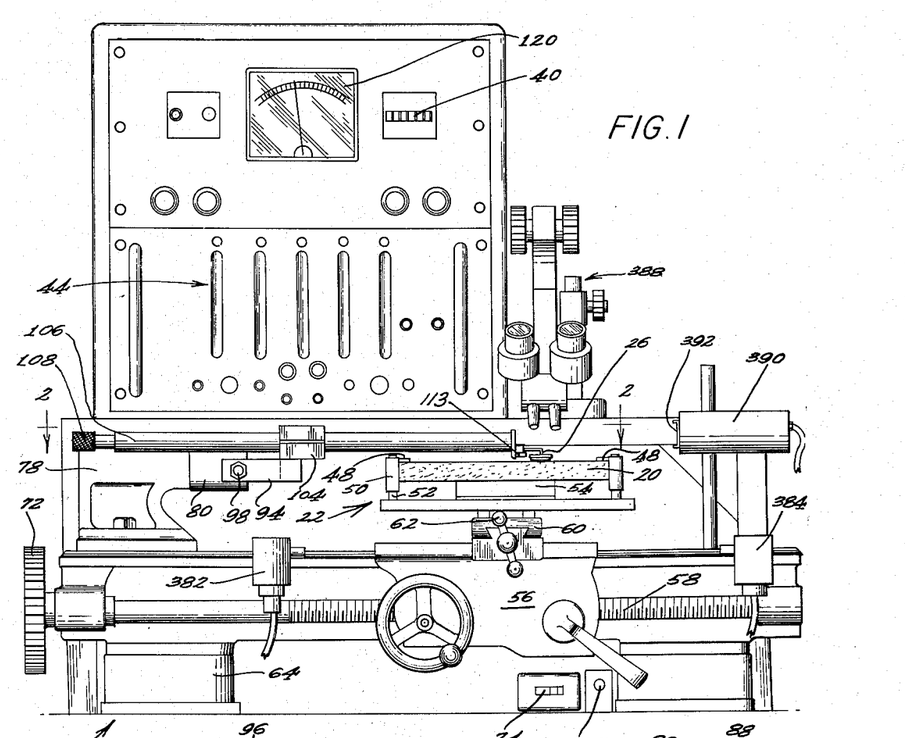
Fig. 1 is a front elevational view of a void detecting, counting, measuring and cataloging apparatus made in accordance with and embodying the principles of the present invention.
Figure 5:
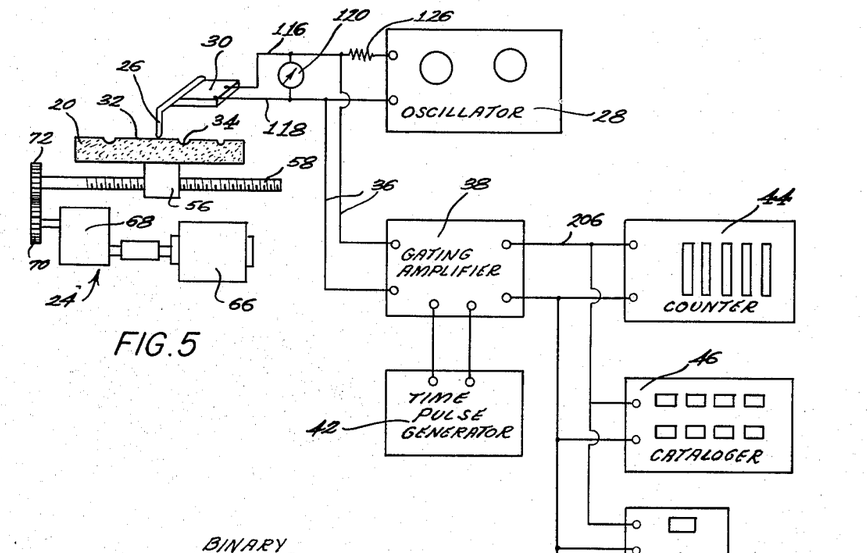
Fig. 5 is a schematic view illustrating the principles of operation of the apparatus illustrated in Fig. 1.

Referring to Figs. 1 and 5 the general construction and operation of the surface void detecting, measuring and cataloging apparatus of the present invention will be described. The sample to be examined such as the sample 20 is mounted upon the movable table 22 of a lathe traversing mechanism generally designated by the numeral 24. The upper surface of the sample 20 is lightly contacted by a stylus 26 which is driven by an electronic oscillator 28. The electronic oscillator 28, in circuit with a resistor, drives stylus 26 through the operation of a crystal 30 on which stylus 26 is mounted. This described arrangement causes stylus 26 to vibrate in a vertical direction substantially perpendicular to the associated surface of sample 20.

Whenever stylus 26 is contacting a smooth plane surface of sample 20 such as at point 32 in Fig. 5, the voltage across the terminals of crystal 30 will be low due to the damping of the oscillations of stylus 26 which is caused by contact with surface 32. Whenever stylus 26 intercepts a void such as void 34, the voltage across the terminals of crystal 30 rises abruptly because the motion of stylus 26 is no longer damped by contact with the sample 20. This rise in voltage is communicated through lines 36 to a gating amplifier 38. Operation of the gating amplifier produces an output signal which operates the void counter 40.

There is connected to gating amplifier 38 the output of a time pulse generator 42 which produces a series of very narrow electrical pulses at an accurately controlled rate of 1000 per second. When stylus 26 encounters a void 34, gating amplifier 38 operates and passes timing pulses from the generator 42 to a high speed electronic counter and display apparatus 44. So long as stylus 26 is in the void, timing pulses are fed to the counter 44 at a predetermined rate and the width of the void can be calculated from the number of timing pulses displayed on counter 44 and the rate of movement of sample 20 as will be described in greater detail later.

Operation of the gating amplifier when stylus 26 intercepts a void also feeds timing pulses to a chord size cataloging apparatus 46 in which the length of the chord of the void intercepted is recorded and cataloged according to size.

The specific construction and operation of the various parts described above will now be explained. The sample 20 is mounted on the table 22 by means of a pair of substantially parallel plates 48 which engage the upper surface of the sample and determine the reference plane of the upper surface of the sample. Plates 48 are mounted on bars 50 supported by posts 52, the bars 50 being movable toward and away from each other to accommodate varying widths of samples. A heavy steel leaf spring 54 engages the underside of the sample and urges it toward and against the overlying plates 48. A sample 20 can be quickly positioned on table 22 by pushing down leaf spring 54, moving the sample underneath the overhanging plates 48 until the sample is centered, and thereafter releasing the sample to permit spring 54 to push the sample against plates 48. This quickly and accurately positions the upper surface of sample 20 with respect to the mount for the stylus 26.

Table 22 is mounted on a lathe carriage generally designated by the numeral 56. Carriage 56 can be moved to the left and the right as viewed in Fig. 1 by rotation of the threaded rod 58 which threadedly engages carriage 56. The upper surface of carriage 56 carries a transverse slide 60 on which is mounted table 22. Table 22 can be rotated and adjusted with respect to slide 60. Slide 60 can be moved perpendicular to the axis of rod 58 by turning handle 62.

The stylus 26 and the associated detecting mechanism is mounted stationary with respect to the lathe base 64 and accordingly relative movement between stylus 26 and the sample 20 is obtained by rotating the threaded rod 58. When examining the sample 20, it is desired to move the sample with respect to the stylus 26 at a predetermined rate and to this end threaded rod 58 is rotated at a constant rate by means of a synchronous motor 66, see Fig. 5. Motor 66 has its output fed through a gear box 68, the output of which is taken from a gear 70 which meshes with and drives a gear 72 fixedly attached to one end of rod 58. Through the above described drive mechanism sample 20 is driven at a constant uniform and predetermined rate underneath stylus 26. Drive motor 66 is controlled by a switch 74 mounted on the lathe base 64, see Fig. 1.

Referring now particularly to Figs. 1 through 4 the mount for the stylus 26 will be described in detail. Bolted to the upper surface of lathe base 64 is an upstanding base member 76 which has a cylindrically apertured portion 78 formed on the upper part thereof. Received within portion 78 is a rod (not shown) which supports another cylindrical member 80. Member 80 has a cylindrical aperture therein disposed perpendicular to the longitudinal axis thereof which receives a circular bar 82. As may be best seen in Fig. 3 bar 82 has groove 84 extending around the circumference thereof in the portion that is positioned within member 80, the groove 84 being semi-circular in section longitudinally of rod 82. Positioned in groove 84 is a ball 86 which is also received in a part-spherical depression formed on the end of a screw 88 that passes through a threaded aperture in member 80. Screw 88 acting against ball 86 serves to hold bar 82 in any desired angular position with respect to member 80.

Each end of bar 82 is provided with an offset conical depression which receives a ball, 90 or 92, respectively. There is provided a U-shaped frame 94 in the shorter legs of which are threadedly positioned screws 96 and 98 which are provided with lock nuts 100 and 102, respectively. The ends of screws 96 and 98 are provided with conical depressions to receive the balls 90 and 92, respectively.

Figures 2, 3, 4:
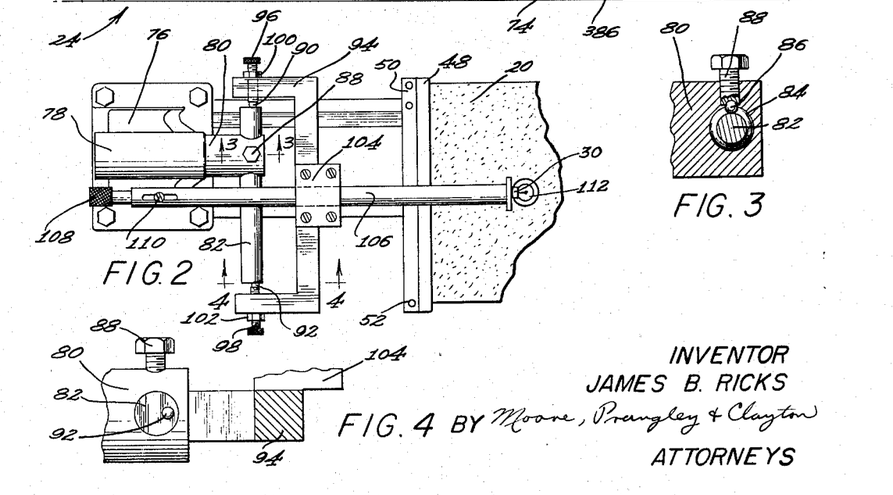
Fig. 2 is a partial plan view of the apparatus shown in Fig. 1 substantially as seen in the direction of the arrows along the line 2—2 of Fig. 1.
Fig. 3 is a view in vertical section substantially as seen in the direction of the arrows along the line 3—3 of Fig. 2.
Fig. 4 is a view in vertical section substantially as seen in the direction of the arrows 4—4 of Fig. 2.

There is clamped to frame 94 by means of plates 104 a hollow tube 106 on the outer end of which is placed any suitable mounting bracket for the crystal and the stylus member carried by the crystal. The left hand end of tube 106 as seen in Fig. 2 is provided with a counterweight 108 which can be moved and adjusted by means of screw 110 to balance accurately the stylus and associated parts which are carried by the right hand end of tube 106.

The positioning of the stylus with respect to the sample 20 can be accurately and minutely adjusted by means of screws 88, 96 and 98. More specifically the distance between the stylus and the surface of the sample can be accurately adjusted so that proper contact of the stylus with the sample surface can be obtained.

Figures 8, 9, 10:
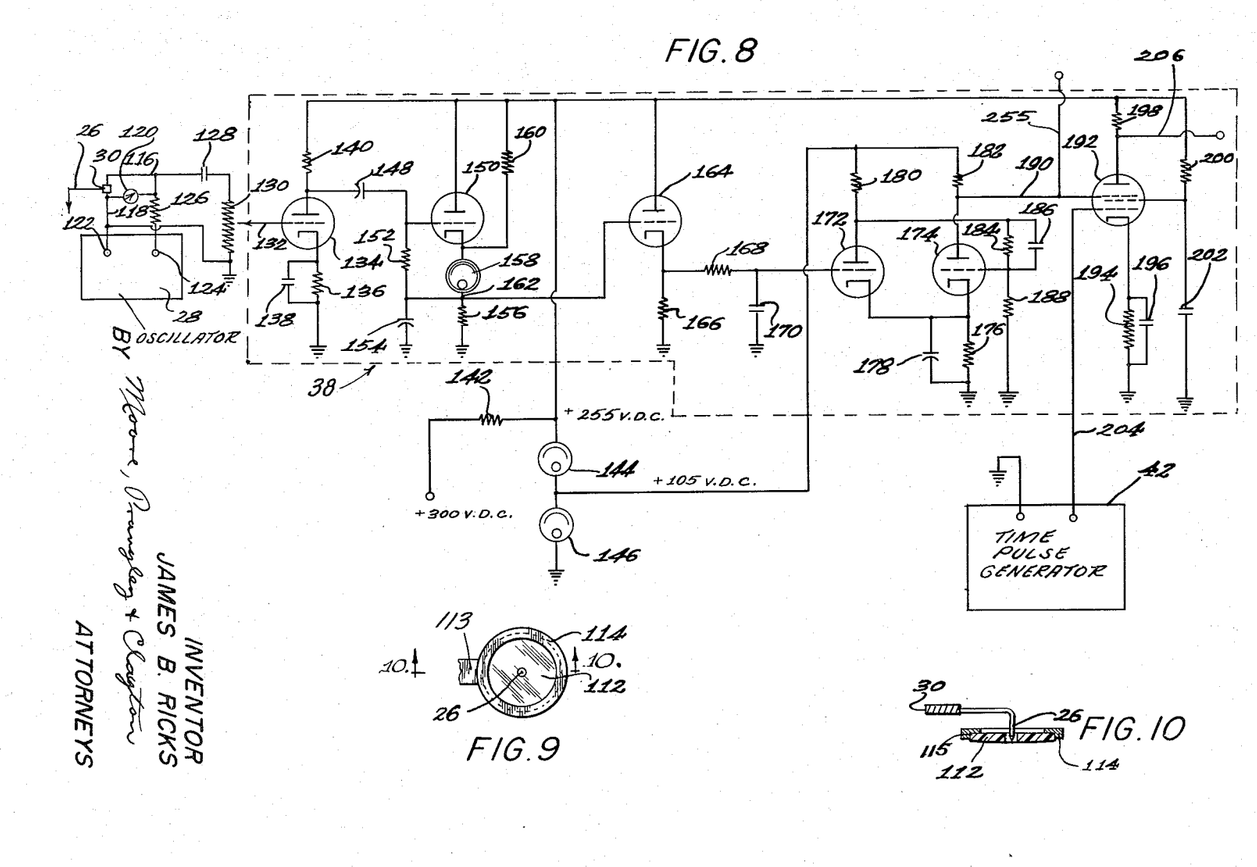
Fig. 8 is a schematic electrical diagram of the void detecting apparatus and gate pulse amplifier used in the present apparatus.
Fig. 9 is a plan view of the void detecting stylus and mount utilized in the present invention.
Fig. 10 is a view in vertical section substantially as seen in the direction of the arrows along the line 10—10 of Fig. 9.

The construction of the stylus and the detecting head can be best seen from Figs. 5, 9 and 10. Referring to Fig. 9, it will be seen that there is provided a disc, lens or rider button 112 which is supported by a circular ring 114. An arm 113 mounts ring 114 on tube 106 (see Figure 1, also). In the center of disc 112 is an aperture through which extends the stylus 26. The disc, lens or rider button is preferably formed of a hard, transparent material, e.g., glass, sapphire or the like and with a bottom convex lens surface of large radius which engages and rides along the surface of the sample. The disc or rider button 112 is of such size and transparency as to provide a useful field of vision or zone of inspection surrounding the stylus tip. The rider button 112 may be press fitted into or cemented in the annular recess 115 of the ring 114 as is best shown in Fig. 10. The upper end of the stylus is fixedly attached as by cementing to a Rochelle salt torsion crystal unit which has been designated by the numeral 30 in Fig. 5. The crystal unit 30 has two electrical contacts thereon which are connected through lines 116 and 118 to the driver oscillator 28. The stylus 26 and crystal unit 30 vibrate in mechanical resonance at a frequency of about 10 kilocycles.

The tip of stylus 26 is provided with a conical diamond having a radius of 0.00025 inch. The diamond tip has good wearing qualities yet is small enough to provide good dimensional resolution. Other sizes of tips may be used depending on the sizes of voids which it is desired to measure.

In operation the sample is driven under the stylus by motor 66 acting through table 22 at a constant uniform rate and the stylus tip vibrates in a vertical direction and makes intermittent contact with the upper surface of the sample 20 except when a void is intercepted. The position of the stylus is so adjusted that its vibration is mechanically damped by contact with the smooth plane surface of the sample but vibrates freely and in an undamped manner when a void is intercepted. The vertical movement of the stylus tip is obtained by driving the crystal unit 30 by the electrical oscillator 28 which is tuned to a frequency equal to the frequency of mechanical resonance of the stylus-crystal unit. In order to facilitate adjustment of the frequency of oscillator 28 a vacuum tube volt meter 120 is positioned across the lines 116—118. With the stylus 26 positioned away and out of contact with a sample the operating frequency of oscillator 28 is adjusted until the reading on the electronic volt meter 120 is a maximum.

The stylus 26 connected to the crystal 30 produces a void detector which has a low self-damping characteristic but which is extremely sensitive to external damping such as is brought about by contact of the stylus tip with specimen 20. In a typical example the output voltage appearing on lines 36 is approximately 2.0 to 3.6 volts when motion of the stylus is damped by contact with sample 20 whereas the free undamped stylus terminal voltage is 4.0 volts. This difference in the terminal voltage occasioned by damping the vibration of stylus 26 through contact with the plane surface of sample 20 and the voltage obtained when a void is intercepted and the stylus is free to vibrate is utilized to trigger the gating amplifier 38. More specifically referring to Fig. 8 it will be seen that the 10 kilocycle oscillator 28 has one terminal 122 connected to ground and the other terminal 124 connected through a resistance 126 to the crystal unit 30 and also to a coupling capacitor 128. The driving oscillator 28 may have zero internal impedance and the resistor 126 is of a value chosen to provide an electrical damping sufficiently low to establish a reasonably high operating sensitivity yet high enough to obtain a rapid response to changes in mechanical damping of the stylus. The other side of capacitor 128 is connected to one end of a resistance 130, the other side of resistance 130 being grounded. Movable contact 132 on resistance 130 is connected to the control grid of a vacuum tube 134 which is the first stage in gating amplifier 38. Tube 134 is preferably one-half of a 6SN7. Resistance 130 which may be 500,000 ohms serves as a gain control so that the value of the signal applied to the control grid of tube 134 can be adjusted. The cathode of tube 134 is connected to ground through a resistor 136 (3,300 ohms) which is by-passed by a capacitor 138 (0.01 μf.). The plate of tube 134 is connected through a resistor 140 (47,000 ohms) to a 255 volt regulated B+ supply.

The 255 volt B+ supply is provided from a 300 volt unregulated supply through a resistance 142 (3,000 ohms) which is connected to a pair of voltage regulator tubes 144 and 146 connected in series, tube 144 being a VR150 and tube 146 being VR105.

It will be seen that tube 134 is connected as an amplifier and serves to amplify the 10 kilocycle signal obtained across the gain control resistor 130. The output of the amplifier tube 134 is taken from the plate through a capacitor 148 (1000 μμf.) and applied to the control grid of a threshold amplifier tube 150 which may be the other half of the 6SN7. The control grid is also connected through a resistor 152 (680,000 ohms) which is in turn connected to a capacitor 154 (0.01 μf.) to ground. The junction of resistor 152 and capacitor 154 is also connected to one end of a resistor 156 (47,000 ohms) the other end of which is connected to ground. Positioned between the cathode of tube 150 and the ungrounded end of resistor 156 is a constant voltage neon lamp 158, type NE51. The cathode is also connected through a resistance 160 (220,000 ohms) to the regulated 255 volt supply. The plate of tube 150 is also connected directly to the 255 volt regulated supply.

Tube 150 has a high constant cathode to grid bias of approximately 45 volts due to the presence of the neon lamp 158. Accordingly this circuit acts as a clipper and gives a rectified positive output at point 162 (the junction of neon tube 158 and resistor 156) which is applied to the control grid of an amplifier and cathode follower 164. Due to the operation of tube 150 no signal is obtained on the control grid of tube 164 when stylus 26 is damped by contact with the smooth plane surface of sample 20 since the gain of tube 134 is adjusted so that it is insufficient to overcome the 45 volt bias imposed on tube 150. A 3.8 volt signal developed across the output of oscillator 28 when amplified through tube 134 is sufficient to obtain an output from tube 150 on the control grid of tube 164. This is the amount of voltage obtained when stylus 26 intercepts a void in the surface of sample 20. It will be seen that tubes 134 and 150 serve to differentiate between a void intercept and the smooth surface of the sample.

When a signal is applied to the control grid of tube 164 it is amplified, the signal being developed across a resistor 166 (22,000 ohms), connected between ground and the cathode of tube 164. The signal applied to the control grid of tube 164 varies from about 11 volts for a non-void intercept to about 17 volts for a void intercept.

The voltage developed on the cathode of tube 164 is filtered through a network consisting of a resistor 168 (47,000 ohms) and a capacitor 170 (0.01 μf.). The output of this filter is fed to the control grid of the tube 172 which may be one-half of a 6SN7. The filtered voltage appearing on the control grid of tube 172 varies from about 19 volts D.C. which indicates contact of the stylus with the surface of the sample and about 24 volts, which indicates the interception of a void by stylus 26.

Tube 172 in conjunction with tube 174 which is the other one-half of a 6SN7 form a bi-stable multivibrator circuit which can be controlled by the D.C. potential applied to the control grid of tube 172. The cathodes of tubes 172 and 174 are connected together and to ground through a resistor 176 (22,000 ohms) which is by-passed by a capacitor 178 (0.01 μf.). The plates of tubes 172 and 174 are connected through a resistor 180 and 182, respectively, each of which has a value of 47,000 ohms, to a regulated 105 volt supply. The plate of tube 172 is also connected to a resistor 184 (470,000 ohms) and a capacitor 186 (50 μμf.) connected in parallel and which are in turn connected to the control grid of tube 174 and to ground through a resistor 188 (270,000 ohms).

In the rest condition, tube 174 is conducting and the output which is taken from its plate through line 190 is 50 volts. Tube 174 is conducting since its control grid is held at a high positive value by the current flowing through resistor 188. The 24 volt signal applied to the control grid of tube 172 when the stylus intercepts a void causes tube 172 to become conducting. Conduction of tube 172 decreases the voltage on the grid of tube 174 and cuts off conduction of tube 174. When tube 174 ceases to conduct, the potential on its plate and on the output line 190 rises to 105 volts.

The positive output on line 190 is used to control the suppressor grid of a gating amplifier tube 192 which is preferably a 6AS6. The purpose of tube 192 is to render counter 44 operative by permitting the accurately timed 1,000 pulse per second timing pulses to be fed from pulse generator 42 to the counting circuits of the counter 44 if a void is intercepted by stylus 26. When the lead 190 is at 50 volts the counter 44 is rendered ineffective to count but when the voltage on that lead rises to 105 volts the counter 44 is rendered effective and the timing pulses delivered to the counter.

It will be understood that the tube 192, with other feed tubes in advance thereof, and the pulse generator 42 may be part of, or included in, the counter 44, and in such case the lead 190 will be connected to the input terminal of the counter 44.

The cathode of tube 192 is connected to ground through a resistor 194 which is by-passed by a capacitor 196. The plate is connected through a resistor 198 to the regulated 255 volt supply and the screen grid is connected through a resistor 200 to the 255 volt regulated supply. A by-pass to ground for the screen grid is provided by capacitor 202.

The timing pulses from the generator 42 are applied to the control grid of tube 192 through line 204. The output from the tube 192 is taken from the plate on line 206. Line 206 is connected to the counter 44, the cataloging apparatus 46 and the void counter 40 as may be best seen from Fig. 5.

The timing pulse generator 42 may be of any desired type so long as the pulses generated thereby are of an accurate and known pulse rate. In the apparatus illustrated a crystal oscillator operating at an accurate frequency of 100,000 cycles per second is provided and the output frequency is divided by multivibrators so that the output is an accurately timed train of pulses at the rate of 1,000 per second.

The output on line 206 which constitutes a train of 1,000 cycle per second negative pulses is transmitted to the counter 44 which is a decimal counting unit. The particular decimal counting unit utilized uses a series of binary counter circuits which are modified Eccles-Jordan trigger circuits having two stable states. Each binary unit is in effect a two stage amplifier with the output of the second stage connected to the input of the first stage of the next binary unit. Four binary units are connected in series or cascade forming a scale-of-16 counter which is permuted to a scale-of-10 counter by a resistor capacitor feedback network from the third stage to the second stage and from the fourth stage to the third stage. The outputs of the counters are fed to neon light indicating units. Such a counter is commercially available in the Berkeley Events-Per-Unit-Time Meter, catalog No. 554 made by the Berkeley Scientific Division of Beckman Instruments, Inc., Richmond, California.

In the counter 44 illustrated 5 scale-of-ten counters have been connected in cascade so that 99,999 timing pulses can be counted before resetting the apparatus.

The operation of the circuit illustrated in Fig. 8 and its connection with counter 44 may be summarized as follows. A sample to be examined is mounted on table 22. Stylus 26 is lifted from contact with the sample and the frequency of driver oscillator 28 is adjusted until the output as indicated by the vacuum tube volt meter 120 is a maximum and preferably about 4.0 volts. Stylus 26 is then lowered against a plane surface of sample 20 as at point 32 until stylus 26 is making light intermittent contact therewith as is indicated by a decided decrease in the voltage on meter 120, the decrease being down to at least below 3.8 volts. The gain control in the form of resistor 130 is adjusted so that no pulses are fed through the tube 192 to the counter 44 when the stylus is touching a plane surface 32 on the sample.

The sample is then moved under stylus 26 by turning on motor 66. As soon as stylus 26 encounters a void such as void 34, the damping of the stylus will be removed and the voltage appearing on resistor 130 (see Fig. 8) will rise above 3.8 volts.

This rise in voltage across resistor 130 will be amplified through tube 134 and will cause operation of tube 150 by overcoming the bias produced by neon tube 158. The signal appearing at the control grid of tube 150 will be a sine wave. Tube 150 will clip the sine wave and the output will be taken at point 162 and applied as a positive signal to the control grid of tube 164. Tube 164 will amplify the signal received and the amplified signal taken from resistor 166 will be filtered through the RC filter consisting of resistor 168 and capacitor 170. The filtered voltage will be a positive pulse of about 24 volts which is sufficient to trigger the bistable multivibrator circuit consisting of tubes 172 and 174. Tube 172 which has heretofore been non-conducting will be driven into conduction by the 24 volt pulse and this renders tube 174 non-conducting. This will feed a positive 105 volt signal through line 190 to the suppressor grid of tube 192. This will cause conduction of tube 192 and will render the counter 44 operative. Timing pulses from generator 42 will now be fed through line 206 to the activated counter 44.

The gating signal from the stylus is transmitted quickly through the above described gating amplifier and accordingly recording of timing pulses will begin immediately upon the encounter of stylus 26 with a void. Timing pulses will be counted as long as stylus 26 is in a void. When stylus 26 emerges from the void and is again damped, the signal across resistor 130 will fall below 3.8 volts and this will cause the succeeding stages to stop operating and will cause the voltage appearing on the control grid of tube 172 to return to 19 volts which is sufficient to stop conduction of tube 172 and resume conduction of tube 174. This action causes the tube 192 to cease operation and renders the counter 44 inoperative.

The number of timing pulses recorded by counter 44 will be proportional to the width of the void intercepted by stylus 26. In the apparatus illustrated the sample is moved under the stylus at a velocity of 1.5 inches per minute and accordingly a counting rate of 1,000 counts per second will produce a count of 40 for each 0.001 inch of void chord dimension intercepted. It will be seen that the total void length intercepted will be recorded on the counter 44.

The same positive 105 volt pulse which activates counter 44 also operates the total void counter 40. Void counter 40 may be an electrically driven mechanical counter which requires an input pulse of about 15 milliseconds for reliable counting. In the alternative an electronic counter can be used which has the advantage of possessing a faster counting resolution and response.

It is to be understood that higher rates of movement of the sample past stylus 26 can be used. Suitable operation has been achieved with velocities as high as 10 inches per minute. It has been found that the void detecting apparatus, the gating amplifier described above and the counter 44 operate satisfactorily at these higher specimen velocities. It is desirable when using higher specimen velocities to use an electronic counter for the total void counter 40.

In certain types of samples such as in hardened concrete the number of voids in a specific size range is of particular significance in predicting and analyzing the physical properties of the specimen. In concrete it is the small and relatively numerous voids which give the greatest protection against damage from freezing and thawing. Accordingly there has been provided in the present invention an apparatus for cataloging voids according to size, the voids being broken up into discrete groups according to the size of the voids intercepted by stylus 26.

Figure 6:
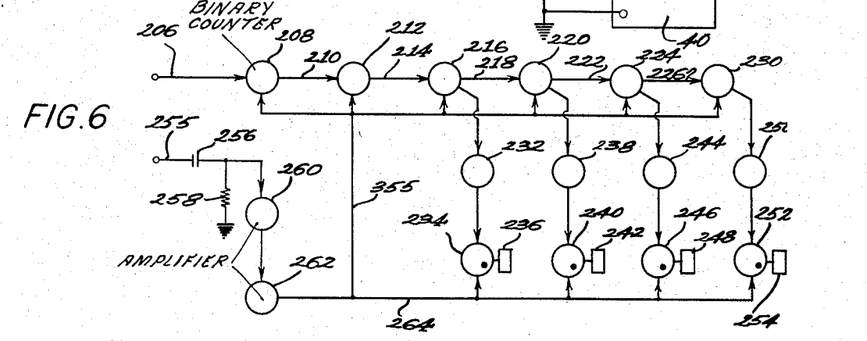
Fig. 6 is a diagrammatic view of one preferred form of void size cataloging apparatus utilized in the present invention.
Figure 11:
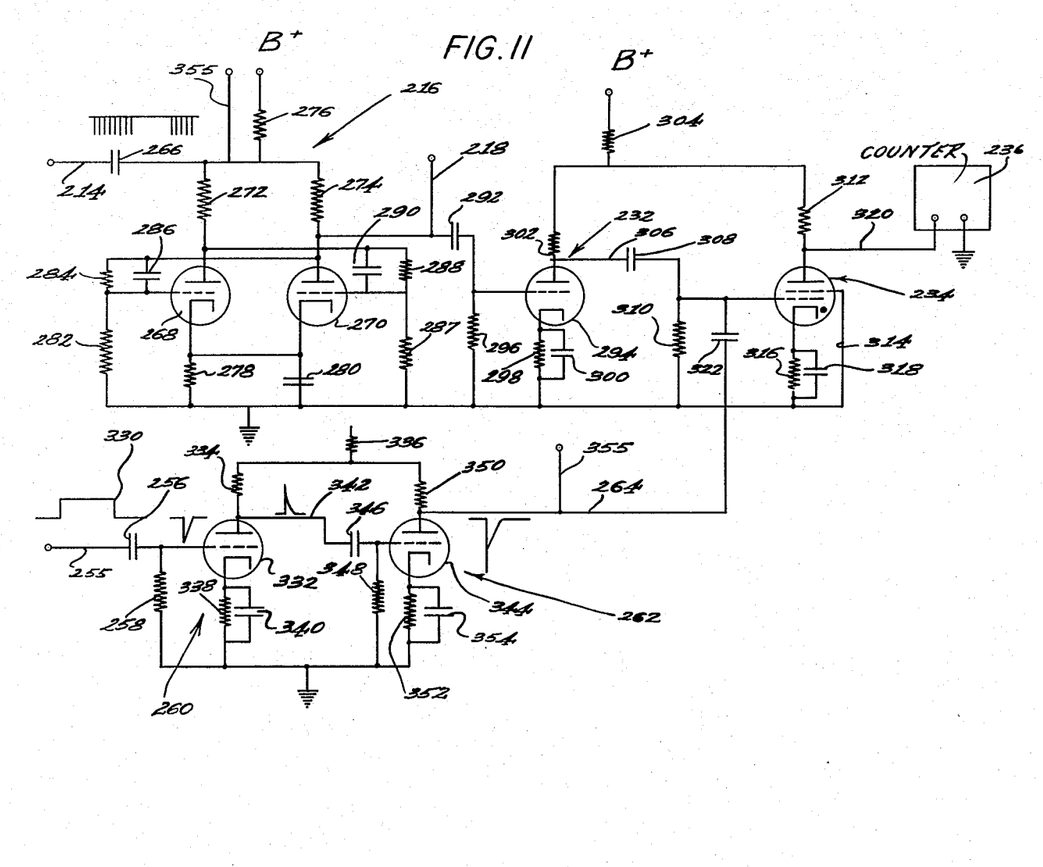
Fig. 11 is an electrical schematic diagram of a part of the void size cataloging circuit schematically shown in Fig. 6.

Referring to Figs. 6 and 11 there is shown one preferred form of void size cataloging apparatus utilized in the present invention. Referring first to Fig. 6 the negative pulse train on line 206 is fed to a bistable binary counter 208 of the type described above and which will be described more fully with respect to Fig. 11. The output of the binary counter 208 is fed along line 210 to a second binary counter 212. It requires an input of two pulses from line 206 to produce an output from counter 208 on line 210 and requires four counting pulse inputs from line 206 to produce an output from counter 212 on line 214.

Further counters in cascade are provided by counter 216 which is connected by line 218 to counter 220 which is in turn connected through line 222 to counter 224 which is in turn connected through line 226 to counter 230. It will be seen that there has been provided a binary cascade counter chain in which the output of counter 208 corresponds to two counts on line 206, counter 212 to 4, counter 216 to 8, counter 220 to 16, counter 224 to 32 and counter 230 to 64 counts on line 206. Voids of the smallest size including those having a size corresponding to 1 to 7 pulses are not cataloged. The first group cataloged are those having a pulse width of at least 8 pulse counts and these are recorded on counter 216. The output of counter 216 is fed to counter 220 and also to an amplifier 232 which drives a thyratron tube 234 which in turn drives a counter 236. Similar amplifiers, thyratrons and counters are provided for the binary counters numbered 220, 224 and 230.

All voids having a width equal to 8 or more timing pulses will be recorded on counter 236. All voids having a width equal to 16 or more pulses will be recorded on counter 242, all voids having a width equal to 32 pulses or more will be recorded on counter 248 and all voids having widths equal to or greater than 64 timing pulses will be recorded on counter 254. By subtraction the number of voids having widths equal to the following number of timing pulses can be calculated: 64 or more, 32 to 63, 16 to 31, and 8 to 15.

It is necessary to provide a cut-off voltage to interrupt the operation of the thyratron tubes 234, 240, 246 and 252 at the end of a void intercept. To this end the positive gating signal developed on line 190 (see Fig. 8) which connects the output of the bi-stable multivibrator circuit and the suppressor grid of the mixer tube 192 is fed along a line 255 to a differentiating circuit including capacitor 256 and resistor 258. This differentiating network transforms the negative going trailing edge of the gating pulse into a sharp negative going pulse which is fed to an amplifier stage 260. Amplifier 260 inverts and amplifies the negative pulse and the output is applied to another amplifier stage 262 which inverts and amplifies the signal. The output from stage 262 is a strong negative signal which is fed along line 264 to cut off the thyratron tubes and prepare them for the next void intercept. This negative pulse is also fed to each of the counters 208, 212, 216, 220, 224 and 230 to reset the counters and prepare them for the next series of timing pulses corresponding to the next intercepted void.

Referring now to Fig. 11 a specific circuit for the cataloging apparatus will be described in detail. More specifically the circuit for the binary counter 216, the amplifier 232, thyratron 234 and counter 236 will be described in detail.

The output from binary 212 is fed along line 214 through a coupling capacitor 266 to the binary 216. Binary 216 includes a pair of tubes 268 and 270 which are halves of a 5963 and are connected in a modified Eccles-Jordan trigger circuit. More specifically each plate of tubes 268 and 270 is connected through a resistance 272 and 274 respectively (70,000 ohms) to a third resistance 276 (27,000 ohms) which is connected to the B+ supply. The cathodes are connected together and through a resistance 278 (15,000 ohms) to ground. Resistance 278 is by-passed by capacitor 280 (0.01 μf.). The control grid of tube 268 is connected through a resistor 282 (100,000 ohms) to ground and through a second resistor 284 (330,000 ohms) to the plate of tube 270. Resistor 284 is in parallel with a capacitor 286 (25 μμf.). The control grid of tube 270 is similarly connected through a resistor 287 (100,000 ohms) to ground and through a resistor 288 (330,000 ohms) to the plate of tube 268. A capacitor 290 (25 μμf.) is in parallel with resistor 288.

In one of the stable circuit conditions tube 270 is conducting and tube 268 is cut-off. A negative input applied on line 214 in the nature of a series of timing pulses causes a drop in the plate voltage of tube 268. This drop in voltage is transmitted to the control grid of tube 270 which causes the plate voltage of tube 270 to rise as conduction of tube 270 decreases. Since the control grid of tube 268 is directly connected to the plate of tube 270, the potential of the control grid of tube 268 rises until tube 268 is conducting. Conduction of tube 268 drives the control grid of tube 268 in a negative direction and cuts off conduction of tube 270. This places the circuit in its second stable state and the circuit remains in this stable state until a second negative pulse is applied from line 214.

The next negative pulse applied on line 214 drives tubes 268 to cut-off and begins conduction through tube 270 causing a decrease in the plate potential of tube 270. This decrease in the plate potential of tube 270 is coupled through a capacitor 292 (25 μμf.) to the control grid of an amplifying tube 294 in the amplifying circuit 232 referred to above. The control grid of tube 294 is also connected to ground through a resistor 296. Self-bias for the tube is supplied by a resistor 298 and a capacitor 300 connected in parallel to ground from the cathode of the tube. A load resistor 302 is provided in the plate circuit and a decoupling resistor 304 connects load resistor 302 to a source of B+ potential. Tube 294 acts as an amplifier and inverter whereby to convert the applied negative pulse received from the control grid to a positive output on line 306.

The positive pulse on line 306 is coupled through a capacitor 308 and developed across a grid resistance 310 in the grid of the thyratron tube 234. Tube 234 is preferably a 2D21 and the positive pulse on its control grid serves to start tube 234 conducting. The plate of tube 234 is connected through a resistor 312 to the decoupling resistor 304 and the screen grid is connected through a line 314 to ground. The cathode is also connected to ground through a resistor 316 and a capacitor 318 which are connected in parallel. The output is taken from the plate of the thyratron tube 234 and is feed through line 320 to the electro-mechanical counter 236.

Once the thyratron tube 234 is fired, it will remain conducting until it is cut-off. A cut-off voltage is applied to the control grid through a capacitor 322. The cut-off voltage is derived from the output of the gating amplifier and is the same positive pulse which is applied to the suppressor grid of tube 192 (see Fig. 8). More specifically the line 255 is connected to line 190 and the positive gating pulse is fed through the differentiating circuit including capacitor 256 and resistor 258 which is connected to ground. The trailing edge of the gating pulse which is designated by the numeral 330 in Fig. 11, is differentiated to produce a sharply negative pulse at the junction of capacitor 256 and resistor 258 which is applied to the control grid of an amplifier tube 332 in the amplifier circuit 260. The plate of tube 332 is connected to a load resistor 334 and in turn with a decoupling resistor 336 which is connected to a B+ supply. Selft bias for tube 332 is provided by connecting the cathode to ground through a resistor 338 and a capacitor 340 which are connected in parallel.

The output from amplifier 332 is a positive amplified signal which appears on line 342 and is fed to the amplifier circuit 262. More specifically the positive signal is applied to the control grid of another amplifier and inverter tube 344 in circuit 262 through a coupling capacitor 346 and developed across a grid resistance 348. Amplifier 344 is also provided with a load resistor 350 that is connected through decoupling resistor 336 to the B+ supply. Self-bias is provided for this stage by connecting the cathode to ground through a resistor 352 and a capacitor 354 which are connected in parallel.

The output of the amplifier and inverter tube 344 is a sharp negative pulse which is applied through coupling capacitor 322 to the control grid of the thyratron tube 234. This negative pulse is sufficient to cut-off thyratron tube 234 and render the circuit opreative to receive the next input pulse.

This negative pulse is also connected through line 355 (see also Fig. 6) to each of the binary counters to reset the counters by rendering the input stage non-conducting and the output stage conducting. This conditions the counter chain for the next void size measurement and cataloging operation.

A summary of the operation of the circuit illustrated in Figs. 6 and 11 is as follows. When a void is intercepted by the stylus 26, a series of timing pulses at the rate of 1,000 per second are fed along line 206 to the binary counter cascade chain. The fourth pulse appearing on line 206 will drive tube 268 (which was formerly non-conducting) into conduction and tube 270 (which was formerly conducting) will be cut off. This will produce a positive pulse as an output to capacitor 292 which when inverted and amplified in tube 294 will produce a negative pulse on the control grid of the thyratron tube 234. This negative pulse will fail to fire the thyratron tube 234 and accordingly there will be no operation of counter 236.

The 8th negative timing pulse appearing on line 206 will send an output from binary 212 and will drive tube 268 into cut-off and will cause conduction of tube 270. This action will provide a negative pulse that will be transmitted to the control grid of tube 294. This negative pulse will be amplified and inverted and will be applied as a positive pulse to the control grid of the thyratron tube 234. This will fire tube 234 and cause operation of the counter 236.

The same action described above will also produce on line 218 a trigger pulse to be the first output to the succeeding binary counter 220.

When stylus 260 arrives at the end of the void, the gating pulse will drop to its no void value and the timing pulses will be interrupted. The negative going end of the gating pulse designated by the numeral 330 in Fig. 11 will be differentiated to form a negative going signal. This negative signal will be twice amplified and inverted through stages 260 (tube 332 in Fig. 11) and stage 262 (tube 344 in Fig. 11) and will appear as a highly amplified negative pulse applied through capacitor 322 to the control grid of the thyratron tube 234. This will cut off tube 234 and prepare the circuit for the next void having a size corresponding to eight or more timing pulses.

The above described operation is repeated in each of the binary counters 216, 220, 224 and 230. By suitable calculations outlined above the number of voids in each of the four discrete size ranges can be calculated. The necessary data are obtained directly as void counts on the counters 236, 242, 248 and 252.

Figure 7:
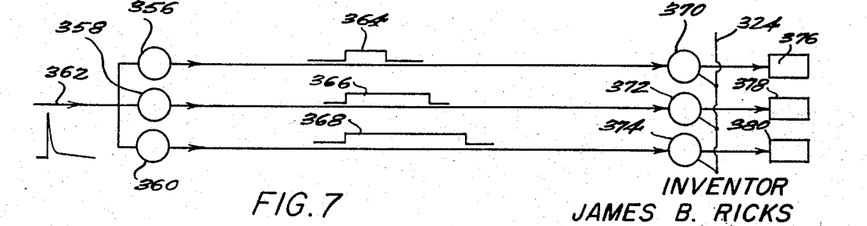
Fig. 7 is a schematic diagram of a second form of void size cataloging apparatus used in the present invention.

There is shown in Fig. 7 a modification of a void cataloging circuit that can be used in the present invention. In this form of cataloging apparatus a series of time gate generators 356, 358 and 360 are provided. A trigger pulse derived by differentiating, as by an R-C circuit (not shown), the leading edge of the gating pulse obtained on line 190 (see Fig. 8) is applied along line 362 to trigger each of the time gate generators 356, 358 and 360. The outputs of these generators are in the nature of substantially square waveform pulses 364, 366 and 368, respectively. These waveforms have accurately predetermined time durations corresponding to certain desired size ranges which are to be cataloged. For example the time duration of waveform 364 corresponds to 8 timing pulses, waveform 366 to 16 timing pulses and waveform 368 to 24 timing pulses.

The above described predetermined waveforms are fed to coincidence amplifiers 370, 372 and 374, respectively. The second input to the coincidence amplifiers is the gating pulse derived from lines 190 and 255 (see Fig. 8) which is the output from the gating amplifier. If the width of the gating pulse appearing on line 324 is as long or longer than the accurately predetermined time gate pulses 364 or 366 or 368, the corresponding coincidence amplifier will operate and feed a signal to actuate an associated counter 376, 378 or 380, respectively.

The number of voids falling in each of the predetermined size groups can be calculated by subtracting the readings on the counters 376, 378 and 380. For example if it is desired to know the number of voids falling in the size range corresponding to 8 to 16 timing pulses, the reading on counter 378 is subtracted from the reading on counter 376.

Although the invention has general application, one specific use in which it has proved valuable is in the determination of voids in hardened concrete. It can be shown by a mathematical derivation that the voids in a volume of concrete can be calculated if the voids or depressions in a statistically large plane surface taken at random through the example is known. Knowledge concerning the size and distribution of size of voids in hardened concrete is valuable since it is the presence of such voids of a particular size which protects the concrete against damage from thawing and freezing.

In using the apparatus of the present invention to determine the void content of a volume of concrete, plane surfaced samples are formed by cutting slabs of desired thickness from the sample. This can be done by using a diamond saw. The plane surface is then coarse and fine ground.

In order to avoid injury to the stylus 26 and associated parts the length of traverse of the sample 20 is controlled by a pair of limit switches 382 and 384 (see Fig. 1) which are contacted and operated by the carriage 56. When either of the limit switches is contacted by the carriage, traverse drive motor 66 is deenergized and the various electronic circuits are also rendered inoperative. The limit switches also provide a means of accurately measuring the total distance traversed. This measurement is obtained by lifting the stylus 26 away from contact with the sample 20 and running the traverse between the two limit switches. The distance is accurately recorded on the total void length counter since operation of the apparatus in this condition is in effect measured by the length of the void from limit switch to limit switch.

When examining concrete samples having voids, it is sometimes desirable that voids in the aggregate material be excluded from the void count and measurement. This is accomplished in the present device by providing a cutout switch 386 which can be manually controlled to render the various counting circuits inoperative. The operator follows the traverse through a binocular microscope 388 (magnification 10×) while the sample is illuminated by a 6 volt spotlight 390 which is provided with a heat filter 392. Whenever an aggregate particle having voids in it is about to be contacted by stylus 26, the switch 386 is actuated to render the counting and cataloging circuits inoperative.

After the sample has been prepared and mounted and a traverse run with the stylus away from the sample to determine accurately the traverse length, the stylus is adjusted so that it is lightly contacting the smooth plane surface of the sample by adjusting screws 88, 96 and 98. A traverse is then begun.

As long as stylus 26 is contacting the smooth plane surface of the sample (i.e., no voids) the output of the crystal unit 30 will be damped and the voltage fed to the gating amplifier 38 will be insufficient to trigger the counting circuits and the gating circuit.

If a void is intercepted by the stylus 26, the voltage at the terminals of the crystal unit will increase to a value equal to 3.8 volts or greater and will cause operation of the gating amplifier 38. Gating amplifier 38 will cause operation of the mixer tube 192 (see Fig. 8) and will allow the 1,000 per second timing pulses to be fed to the various counting circuits.

The initial operation of the gating amplifier 38 will actuate the total void counter 40 and will render operative the total void length counter 44 and the void size cataloging apparatus 46.

As long as the stylus 26 is in the void, the timing pulses from generator 42 will be recorded in the total void length counter 44. When the stylus emerges from the void, the gating pulse will be removed from tube 192 which will stop conducting and no more timing pulses will be fed to counter 44.

While the counting pulses are being fed to counter 44, they are also being fed to the cataloging apparatus illustrated in Figs. 6 and 11. The size of the void encountered by the stylus is determined by the binary chain composed of counters 208, 212, 216, 220, 224 and 230. Appropriate indication and counting of the voids according to size will be made on one of the cataloging counters 236, 242, 248 or 252.

When the stylus emerges from the void, a trigger pulse is formed by differentiating the trailing edge of the gating pulse. This trigger pulse is amplified and utilized to reset the binary counter chain and to extinguish the thyratron tubes 234, 240, 246 and 252 which operate the catalog counters.

Instead of the cataloging apparatus illustrated in Figs. 6 and 11 of the drawings, the cataloging apparatus of Fig. 7 may be utilized as has been explained above.

It will be seen that there has been provided a testing apparatus which possesses all of the advantages and satisfies the objects set forth above. More specifically there has been provided a testing apparatus which will accurately and automatically detect and count voids present in a plane surface, will accurately measure the length of the voids and record the total length of voids encountered, and will catalog and count the voids falling in a predetermined void size range. All of these operations are done rapidly and accurately and substantially automatically.

Although certain preferred embodiments of the invention have been utilized for purposes of illustration, it is to be understood that various changes and modifications can be made therein without departing from the spirit and scope of the invention. Accordingly, the invention is to be limited only as set forth in the following claims.

I claim:

1. An apparatus for detecting voids in a substantially smooth surface comprising a stylus, means mounting said stylus to make light contact with the smooth surface, electrical oscillator means to vibrate said stylus toward and away from said surface, the output of said electrical oscillator means being responsive to the motion of said stylus to distinguish by the variable voltage of its output between the motion of said stylus when in contact with the smooth surface and the motion when the stylus is in a void whereby to detect the presence of voids in the smooth surface and means responsive to the variable output voltage of the electrical oscillator means for indicating when said stylus is in a void.

2. An apparatus for detecting voids in a substantially smooth surface comprising a stylus, means mounting said stylus to make light contact with the smooth surface, a crystal attached to said stylus, an electrical oscillator connected to said crystal and operative to vibrate said crystal and the attached stylus at a rate substantially equal to the mechanical resonance of said stylus and crystal, the output voltage of said electrical oscillator being damped and lowered when said stylus is in contact with the smooth surface and the output voltage of said oscillator substantially rising when said stylus intercepts a void, and means responsive to the variable output voltage of said oscillator for indicating when said stylus intercepts a void.

3. An apparatus for detecting voids in a substantially smooth surface comprising a stylus, means mounting said stylus to make light contact with the smooth surface, a Rochelle salt crystal attached to said stylus, an electrical oscillator connected to said crytal and operating at a frequency substantially equal to the mechanical resonance frequency of said stylus and crystal, the output voltage of said electrical oscillator being damped and lowered when said stylus is in contact with the smooth surface and the output voltage of said oscillator substantially rising when said stylus intercepts a void, and means responsive to the variable output voltage of the oscillator for indicating when said stylus intercepts a void.

4. An apparatus as set forth in claim 3, wherein the stylus is provided with a conical diamond tip having a radius on the order of 0.00025 inch.

5. An apparatus for detecting voids in a substantially smooth surface comprising a stylus, means mounting said stylus to make light contact with the smooth surface, a crystal unit attached to said stylus to vibrate said stylus toward and away from said surface when the crystal unit is energized, and an electrical oscillator connected to said crystal unit to drive said crystal unit at a rate substantially equal to the mechanical resonance frequency of said stylus and crystal unit, said electrical oscillator being responsive to the motion of said stylus to distinguish by the variable voltage of its output between the motion thereof when in contact with the smooth surface and the motion thereof when the stylus is in a void whereby to detect the presence of voids in the smooth surface and means responsive to the variable output voltage of the oscillator for indicating when said stylus is in a void.

6. An apparatus for detecting voids in a substantially smooth surface comprising a stylus, means mounting said stylus to make light contact with the smooth surface, a crystal unit mounted on said stylus to vibrate said stylus toward and away from said surface when said crystal unit is energized, an electrical oscillator connected to said crystal unit and operating at a frequency substantially equal to the mechanical resonance frequency of said stylus and crystal unit, the voltage at the output terminals of said oscillator being substantially dampened when said stylus is in contact with said smooth surface and the voltage at the output terminals of said oscillator substantially rising when said stylus encounters a void, and means responsive to the voltage of the output terminals of said oscillator to differentiate between contact of said stylus with the smooh surface and interception of said stylus with a void.

7. An apparatus for detecting voids in a substantially smooth surface comprising a stylus, means mounting said stylus to make light contact with the smooth surface, an electrical oscillator connected to said stylus to vibrate said stylus toward and away from said surface, means to move said surface under said stylus at a constant and predetermined velocity, said electrical oscillator being responsive to the motion of said stylus to distinguish by the variable output voltage between the motion thereof when in contact with the smooth surface and the motion thereof when the stylus is in a void, and counter means responsive to the variable output voltage of the oscillator for actuation only during the time the stylus is in a void.

8. An apparatus for detecting voids in a substantially smooth surface comprising a stylus, means mounting said stylus to make light contact with the smooth surface, a crystal unit mounted on said stylus, an electrical oscillator connected to said crystal unit and operating at a frequency substantially equal to the mechanical resonance frequency of said stylus and crystal unit, means to move the smooth surface at a constant and uniform velocity under said stylus, the output voltage of said crystal unit being damped and lowered when said stylus is in contact with the smooth surface and the output voltage of said crystal unit substantially rising when said stylus intercepts a void, and counter means responsive to the rise in voltage at the output terminals of said crystal unit to count and record the voids in the smooth surface.

9. A gating amplifier circuit comprising a clipper having an input circuit and an output circuit, said clipper producing an output current only when an input voltage of a predetermined amount is applied thereto, a bistable multivibrator, and means connecting the output circuit of said clipper to the input of said bistable multivibrator for triggering the multivibrator from one stable condition to the other when said clipper produces an output current and triggering the multivibrator to its original stable condition when said clipper produces no output current.

10. A gating amplifier circuit comprising an amplifier having an input circuit and an output circuit and a high fixed control grid to cathode bias, said amplifier producing an output current only when an input voltage of a predetermined amount is applied to the input circuit, a pair of electron tubes connected in circuit to form a bistable multivibrator, one of said tubes being normally conducting while the other of said tubes is non-conducting, and means connecting the output circuit of said amplifier to the control grid of said electron tube that is normally non-conducting for triggering the multivibrator from one stable condition to the other stable condition when said amplifier produces an output current and triggering the multivibrator to its original stable condition when said amplifier produces no output current.

11. A gating amplifier circuit comprising an amplifier having an input circuit and an output circuit and a high fixed control grid to cathode bias, said amplifier operating as a clipper producing an output current only when an input voltage of a predetermined amount is applied to the input circuit, an RC filter connected to the output circuit of said amplifier, a pair of tubes connected in circuit to form a bistable multivibrator, one of said tubes being normally conducting while the other of said tubes is normally non-conducting and means connecting the output of said RC filter to the control grid of said electron tube that is normally non-conducting for triggering the multivibrator from one stable condition to the other stable condition when said clipper produces an output current and triggering the multivibrator to the original stable condition when said clipper produces no output current.

12. A gating amplifier circuit comprising a first amplifier having a high fixed control grid to cathode bias, a second amplifier having the input thereto connected with the cathode of said first amplifier, said first amplifier operating as a clipper and cathode follower, the cathode of said second amplifier being connected to an RC filter, a pair of tubes connected in circuit to form a bistable multivibrator, one of said tubes being normally conducting while the other of said tubes is non-conducting, and means connecting the output of said RC filter to the control grid of the electron tube that is normally non-conducting, a positive output from said RC filter driving said non-conducting tube into conduction and producing a high positive-going voltage on the plate of said normally conducting electron tube.

13. A gating amplifier circuit comprising a first amplifier having the control grid thereof connected to a gain control, means connecting the plate of said first amplifier to the control grid of a second amplifier, said second amplifier having a high fixed control grid to cathode bias, a third amplifier, a means connecting the cathode of said second amplifier to the input of said third amplifier, said second amplifier acting as a clipper and cathode follower, an RC filter having its input connected to the cathode of said third amplifier, a pair of tubes connected in circuit to form a bistable multivibrator, one of said tubes being normally conducting while the other of said tubes is non-conducting, and means connecting the output of said RC filter to the control grid of said normally non-conducting electron tube, a positive-going predetermined voltage output from said RC filter driving said normally non-conducting electron tube into conduction and producing a high positive-going voltage as an output on the plate of said normally conducting electron tube.

14. A sample mount for testing apparatus to receive a sample having a substantially smooth plane surface comprising a base, a pair of spaced apart plates mounted on said base and having one face of each lying in the same plane, said plane being spaced from said base, and a spring mounted on said base and spaced from said faces in a position resiliently to hold a sample against said faces.

15. A sample mount as set forth in claim 14, wherein the distance between said plates is adjustable.

16. A mount for detecting member comprising a base having a circular aperture therein, a bar having a circular cross section extending through said aperture, a substantially U-shaped frame having leg portions positioned adjacent each end of said bar, means on said leg portions engaging the associated bar end in an adjustable manner, and a rod mounted on said U-shaped frame and carrying a detecting member on one end thereof spaced from said frame.

17. A mount for detecting member comprising a base having an aperture therein, a bar extending through said aperture, a set screw mounted in said base and extending into said aperture adjustably to engage said bar, a U-shaped frame having spaced apart leg portions positioned opposite the ends of said bar, each end of said bar having a conical depression positioned eccentrically with respect to the axis of said bar, a ball positioned in each of said depressions, and a screw mounted in each of said leg portions and engaging the associated ball to hold said ball in said depression, and a rod mounted on said U-shaped frame and carrying the detecting member on one end thereof spaced from said U-shaped frame, the position of said bar with respect to said base being minutely adjustable and the position of said frame with respect to said bar being minutely adjustable.

18. An apparatus for measuring the total void length in a substantially smooth surface comprising a void detector including a stylus, means to move the smooth surface under said stylus at a constant and a predetermined velocity, signal generating means connected to said stylus to generate a signal when said stylus is in a void, a gating amplifier connected to said signal generating means and operative to produce a gating signal when a signal is generated by said signal generating means, a generator for generating accurately timed timing pulses, and a counter normally inoperative and rendered operative by the gating signal to receive and count timing pulses so long as said stylus is in a void and a gating signal is applied to said counter.

19. An apparatus for measuring the total void length in a substantially smooth surface comprising a void detector including a stylus, means to move the smooth surface at a constant and a predetermined velocity beneath said stylus, signal generating means connected to said stylus to generate a signal when said stylus is in a void, a gating amplifier connected to said signal generating means and operative to produce a gating signal when a signal is generated by said signal generating means, an oscillator for generating accurately timed timing pulses, an electronic counter connected to said gating amplifier, said counter being normally inoperative and rendered operative upon receiving a gating signal to count pulses from said pulse generator so long as the gating signal is applied thereto, and a total void counter connected to said gating amplifier and actuated once for each gating pulse to count the number of individual voids encountered by said stylus.

20. An apparatus for measuring the total void length in a substantially smooth plane surface comprising a stylus, means mounting said stylus to make light contact with the smooth plane surface, an electrical oscillator connected to said stylus to vibrate said stylus toward and away from said surface, means to move said surface under said stylus at a constant and a predetermined velocity, the output voltage of said oscillator being damped and lowered when said stylus is in contact with the plane surface and the output voltage of said oscillator substantially rising when said stylus intercepts a void, a gating amplifier connected to the output voltage of said oscillator to produce a gating signal when the stylus is in a void, an electrical counter connected to said gating amplifier, said counter being normally inoperative and rendered operative when receiving a gating signal from said gating amplifier, a generator for forming predetermined and accurately timed timing pulses, and means to feed said timing pulses to said counter when said counter is rendered operative by a gating signal.

21. An apparatus for measuring the total void length in a substantially smooth plane surface comprising a stylus, means mounting said stylus to make light contact with the smooth plane surface, a crystal unit mounted on said stylus, an electrical oscillator connected to said stylus unit and operating at a frequency substantially equal to the mechanical resonance frequency of said stylus and crystal unit, means to move the smooth plane surface at a constant and uniform velocity under said stylus, the output voltage of said oscillator being damped and lowered when said stylus is in contact with the smooth plane surface and the output voltage of said oscillator substantially rising when said stylus intercepts a void, a gating amplifier connected to the output of said oscillator and responsive to produce a gating signal when the output voltage rises above a predetermined value, a counter connected to said amplifier, said counter being normally inoperative and being rendered operative upon receipt of a gating signal from said gating amplifier, and a time pulse generator connected to said gating amplifier, the timed pulses being fed to said counter when said counter is rendered operative by receipt of a gating signal.

22. An apparatus for cataloging voids in a substantially smooth plane surface according to void size comprising a void detector including a stylus, means for moving the smooth plane surface underneath said stylus at a constant and uniform velocity, signal generating means connected to said stylus to generate a signal when said stylus is in a void, a gating amplifier connected to said signal generating means and operative to produce a gating signal when said stylus intercepts a void and so long as said stylus is in a void, and a void size cataloging apparatus actuated by said gating amplifier and operative to sort and record said voids according to void size.

23. An apparatus for measuring the total void length in a substantially smooth plane surface and cataloging the voids according to void size comprising a detecting unit including a stylus, means for moving the smooth plane surface underneath said stylus at a constant and uniform velocity, signal generating means connected to said stylus to generate a signal when said stylus is in a void, a gating amplifier connected to said signal generating means and operative to produce a gating signal when said stylus intercepts a void and so long as said stylus is within a void, an electronic counter connected to said gating amplifier, said electronic counter being normally inoperative and being rendered operative by a gating signal from said gating amplifier, a time pulse generator connected to said gating amplifier, time pulses being fed to said electronic counter when a gating signal is produced by said gating amplifier, and a void size cataloger connected to said gating amplifier and operative to catalog and record voids according to void size when actuated by said gating amplifier.

24. An apparatus for measuring the total void length in a substantially smooth plane surface and cataloging the voids according to void size comprising a detecting unit including a stylus, means for moving the smooth plane surface undereneath said stylus at a constant and uniform velocity, signal generating means connected to said stylus to generate a signal when said stylus is in a void, a gating amplifier connected to said signal generating means and operative to produce a gating signal when said stylus intercepts a void and so long as said stylus is within a void, an electronic counter connected to said gating amplifier, said electronic counter being normally inoperative and being rendered operative by a gating signal from said gating amplifier, a time pulse generator connected to said gating amplifier, time pulses being fed to said electronic counter when a gating signal is produced by said gating amplifier, a void size cataloger connected to said gating amplifier and operative to catalog and record voids according to void size when actuated by said gating amplifier, and a total void counter connected to said gating amplifier and operated once for each gating signal produced by said gating amplifier.

25. An apparatus for measuring the total void length in a substantially smooth surface comprising a void detector including a stylus, signal generating means connected to said stylus to generate a signal when said stylus is in a void, means to move the smooth surface under said stylus at a constant predetermined velocity, a gating amplifier including a clipper connected to said stylus and producing an output only when an input of a predetermined amount is produced by said signal generating means, a bistable multivibrator, means connecting the output of said clipper to the input of said bistable multivibrator, said multivibrator being in a first stable condition when said stylus is in contact with a smooth upper surface and said multivibrator being driven to a second stable condition by said clipper when said stylus enters a void and remains in said stable condition so long as said stylus is in a void, a generator for generating accurately timed timing pulses, a counter normally inoperative and rendered operative by the multivibrator when said multivibrator is in said second stable condition to receive and count timing pulses so long as said stylus is in a void.

References Cited in the file of this patent
UNITED STATES PATENTS

| | | |
|---|---|---|
| 2,399,135 | Miller et al. | Apr. 23, 1946 |
| 2,405,133 | Brown | Aug. 6, 1946 |
| 2,408,078 | Labin et al. | Sept. 24, 1946 |
| 2,460,726 | Arndt | Feb. 1, 1949 |
| 2,541,039 | Cole | Feb. 13, 1951 |
| 2,549,875 | Williams et al. | Apr. 14, 1951 |
| 2,601,491 | Baker | June 24, 1952 |
| 2,642,427 | Kelly | June 16, 1953 |
| 2,651,204 | Dickinson | Sept. 8, 1953 |
| 2,680,241 | Gridley | June 1, 1954 |
| 2,688,695 | Odell | Sept. 7, 1954 |
| 2,698,382 | Uglow | Dec. 28, 1954 |
| 2,728,222 | Becker et al. | Dec. 27, 1955 |
| 2,752,589 | DeLong | June 26, 1956 |

UNITED STATES PATENT OFFICE
CERTIFICATION OF CORRECTION

November 29, 1960

Patent No. 2,961,871

James B. Ricks

It is hereby certified that error appears in the above numbered patent requiring correction and that the said Letters Patent should read as corrected below.

Column 10, line 11, for "feed" read -- fed --; column 14, line 9, for "dampened" read -- damped --; line 25, for "the", first occurrence, read -- its --; column 15, lines 57 and 66, after "for", each occurrence, insert -- a --; column 17, line 43, for "undereneath" read -- underneath --; column 18, line 41, list of references cited, for "Apr. 14, 1951" read -- Apr. 24, 1951 --; line 43, for "2,642,427" read -- 2,642,527 --.

Signed and sealed this 30th day of May 1961.

(SEAL)
Attest:

ERNEST W. SWIDER
Attesting Officer

DAVID L. LADD
Commissioner of Patents